United States Patent
Vogelsong

(10) Patent No.: US 9,883,149 B2
(45) Date of Patent: Jan. 30, 2018

(54) IMAGING SENSOR AND METHOD FOR COLOR NIGHT VISION

(71) Applicant: SRI International, Menlo Park, CA (US)

(72) Inventor: Thomas Lee Vogelsong, Lawrenceville, NJ (US)

(73) Assignee: SRI International, Menlo Park, CA (US)

( * ) Notice: Subject to any disclaimer, the term of this patent is extended or adjusted under 35 U.S.C. 154(b) by 26 days.

(21) Appl. No.: 14/796,265

(22) Filed: Jul. 10, 2015

(65) Prior Publication Data

US 2016/0037109 A1 Feb. 4, 2016

Related U.S. Application Data

(60) Provisional application No. 62/031,886, filed on Aug. 1, 2014.

(51) Int. Cl.
*H04N 3/14* (2006.01)
*H04N 5/335* (2011.01)
*H04N 9/04* (2006.01)

(52) U.S. Cl.
CPC .................... *H04N 9/045* (2013.01)

(58) Field of Classification Search
CPC ........... H04N 9/045; H04N 5/332; H04N 5/33
USPC .................. 348/270–276, 294–324
See application file for complete search history.

(56) References Cited

U.S. PATENT DOCUMENTS

| | | | |
|---|---|---|---|
| 3,971,065 A | 7/1976 | Bayer | |
| 7,012,643 B2 | 3/2006 | Frame | |
| 7,135,698 B2 | 11/2006 | Mitra | |
| 7,535,504 B2 | 5/2009 | Frame et al. | |
| 8,194,296 B2 * | 6/2012 | Compton | H04N 9/045 358/500 |

(Continued)

FOREIGN PATENT DOCUMENTS

| | | |
|---|---|---|
| JP | 2013-042530 | 2/2013 |
| KR | 10-2013-0070453 | 6/2013 |
| WO | 2013/172205 | 11/2013 |

OTHER PUBLICATIONS

International Search Report & Written Opinion in counterpart International Patent Application No. PCT/US15/39931, dated Oct. 28, 2015; 13 pages.

(Continued)

*Primary Examiner* — Yogesh Aggarwal
(74) *Attorney, Agent, or Firm* — McDonnell Boehnen Hulbert & Berghoff LLP

(57) ABSTRACT

An imaging sensor for low light level color imaging includes an array of pixels. Each pixel has a first pixel portion that has a first photosensitive area and is responsive to light in a panchromatic spectral range and a second pixel portion that has a second photosensitive area and is responsive to light in a sub-band spectral range. The first photosensitive area is greater than the second photosensitive area and the sub-band spectral range is narrower than and contained within the panchromatic spectral range. The first and second pixel portions of each pixel are independently addressable. The imaging sensor is beneficial for applications requiring wide dynamic range, low light sensitivity and color discrimination, and enables improved object discrimination and scene interpretation.

20 Claims, 8 Drawing Sheets

(56) References Cited

U.S. PATENT DOCUMENTS

| | | | |
|---|---|---|---|
| 8,446,470 B2 | 5/2013 | Lu et al. | |
| 8,547,504 B2 | 10/2013 | Guo et al. | |
| 8,559,113 B2 | 10/2013 | Wehner | |
| 8,786,732 B2 | 7/2014 | Puetter et al. | |
| 8,848,140 B2 | 9/2014 | Guo et al. | |
| 2004/0159861 A1* | 8/2004 | Mori | H01L 27/14609 257/223 |
| 2005/0094010 A1* | 5/2005 | Abe | H04N 3/1562 348/294 |
| 2006/0017829 A1 | 1/2006 | Gallagher | |
| 2010/0231738 A1* | 9/2010 | Border | H04N 5/2353 348/222.1 |
| 2010/0295947 A1 | 11/2010 | Boulanger | |
| 2012/0113290 A1 | 5/2012 | Nakata et al. | |
| 2013/0062512 A1* | 3/2013 | Hu | H01L 27/14601 250/226 |
| 2014/0132946 A1 | 5/2014 | Sebastian et al. | |
| 2015/0144770 A1* | 5/2015 | Choi | G01N 21/29 250/208.1 |

OTHER PUBLICATIONS

Chen, Zhenyue, et al, "RGB-NIR multispectral camera", Optics Express, Feb. 2014, vol. 22, No. 5, OSA; 10 pages.

Xu, Ting, et al., "Plasmonic nanoresonators for high-resolution colour filtering and spectral imaging", Nature Communications, Aug. 2010, Macmillan Publishers Limited; 5 pages.

Catrysse, Peter B. and Brian A. Wandell, "Integrated color pixels in 0.18-µm complementary metal oxide semiconductor technology", Journal of the Optical Society of America, Dec. 2003, vol. 20, No. 12, pp. 2293-2306.

Catrysse, Peter B., et al., "One-mode model for patterned metal layers inside integrated color pixels", Optics Letters, May 1, 2004, vol. 29, No. 9, pp. 974-976.

International Preliminary Report on Patentability in counterpart International Patent Application No. PCT/US15/39931, dated Feb. 16, 2017; 10 pages.

* cited by examiner

IMAGING SENSOR AND METHOD FOR COLOR NIGHT VISION

RELATED APPLICATION

This utility application claims the benefit of U.S. Provisional Application No. 62/031,886, filed on Aug. 1, 2014, titled "Improved Method of Providing True Color Night Vision with Minimal Loss in Low Light Sensitivity," the entirety of which provisional application is incorporated by reference herein.

FIELD OF THE INVENTION

The invention relates generally to an imaging sensor for low light level applications such as night vision, surveillance, automotive, and cell phone cameras for low light image or video capture. More specifically, the invention relates to a low light level sensor having color imaging capability.

BACKGROUND

The addition of true color in an image or video can provide more information to a human observer or computer processor than a panchromatic luminance-only image. This additional color information can assist in making critical decisions. For example, image understanding and target discrimination are improved when the color information provided is comparable to the color seen by the human eye ("true color") as opposed to taking spectral bands not seen by the human eye and mapping them on the display as colors ("false color").

When capturing images under low light conditions, such as those occurring at night, the number of photons in the visible spectrum is limited and therefore the signal-to-noise ratio (SNR) in an image captured by an image sensor sensitive in the visible spectrum is inherently limited. If a color image is captured by the image sensor, the number of photons is further reduced since the light incident on a single sensor element is filtered to remove all the photons that are not within the bandpass of the filter. For example, a red filter blocks all photons in the green and blue portions of the spectrum. Thus, the SNR of a true color night vision image or video is further degraded compared to a panchromatic night vision image or video.

Silicon-based image sensors, such as sensors fabricated using complementary metal-oxide semiconductor (CMOS) processes, capture photons in the visible and the near infrared (NIR) spectral bands unless there is a spectral filter blocking a portion of these bands. Under typical night conditions, the majority of ambient light is in the near infrared band compared with that in the visible band. Thus for a silicon sensor with color filters and an NIR blocking filter, there is a greater degradation of image quality due to the smaller signal level and therefore smaller SNR of a color night vision image captured with a silicon-based image sensor compared to a visible +NIR panchromatic image captured with that same silicon-based image sensor.

SUMMARY

In one aspect, the invention features an imaging sensor for low light level imaging. The imaging sensor includes an array of pixels in which each pixel includes a first pixel portion having a first photosensitive area and a second pixel portion having a second photosensitive area. The first pixel portion is responsive to light in a panchromatic spectral range and the second pixel portion is responsive to light in a sub-band spectral range. The first photosensitive area is greater than the second photosensitive area and the sub-band spectral range is narrower than and contained within the panchromatic spectral range. The first pixel portion and the second pixel portion of each pixel are independently addressable.

In another aspect, the invention features a method for low light level imaging. The method relates to an array of pixels in an image sensor wherein each pixel in the array includes a first pixel portion responsive to light in a panchromatic spectral range and further includes a second pixel portion. The first pixel portion has a photosensitive area that is greater than a photosensitive area of the second pixel portion and the first and second pixel portions are independently addressable. The method includes, for each pixel in the array of pixels, filtering light incident on the second pixel portion so that only light in a sub-band spectral range that is narrower than and contained within the panchromatic spectral range is incident on the photosensitive area of the second pixel portion. Image data for the first pixel portions of the pixels in the imaging sensor are read to acquire panchromatic image data for an image formed on the array of pixels. Image data for the second pixel portions of the pixels in the image sensor are read to acquire sub-band image data for the image formed on the array of pixels.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

The terminology used herein is for the purpose of describing particular embodiments only and is not intended to be limiting.

As used herein, a "panchromatic spectral range" means a spectral range corresponding to all wavelengths of radiation that can be sensed by a detector element. A sub-band spectral range means a range of wavelengths of radiation that is smaller than and contained within the panchromatic spectral range. In various embodiments described below the panchromatic spectral range includes the range of wavelengths of light to which a pixel or sub-pixel can generate a response. By way of a non-limiting example, a panchromatic spectral range for a silicon CMOS imaging sensor may include a wavelength band that includes the full visible spectrum of light, NIR light and a portion of the ultraviolet spectral range. For example, the panchromatic spectral range for such a silicon CMOS sensor may extend from less than 400 nm to more than 1100 nm.

As used herein, "photosensitive area" means the area of a pixel or detector that is responsive to incident light, such as the responsive area of a pixel in an imaging array, so that electrical charge is generated according to the intensity of light incident on part or all of the photosensitive area.

Figure 1:
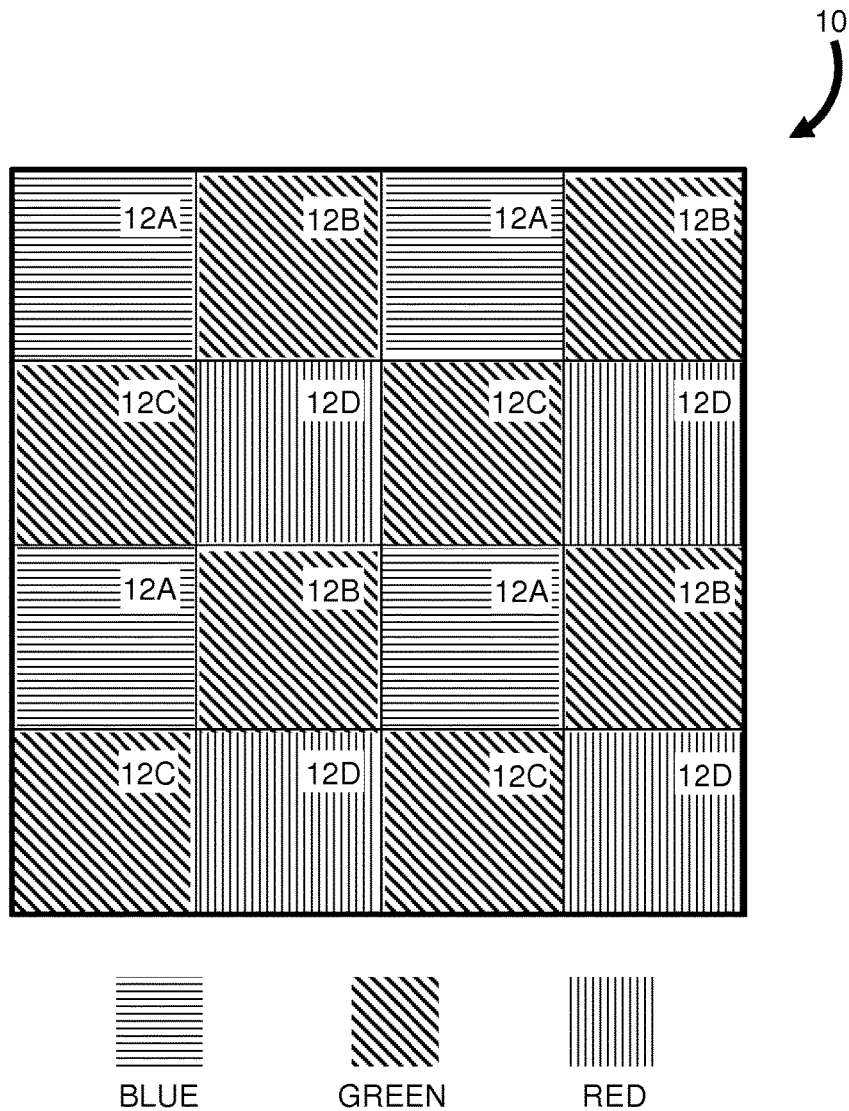
FIG. 1 is an illustration of a portion of an imaging array having a Bayer filter pattern.

In conventional color imagers used in daylight conditions most or all of the pixels are covered by color filters. One common filter pattern used on image sensors for digital cameras and cell phone cameras is the Bayer pattern. A description of Bayer patterns is provided in U.S. Pat. No. 3,971,065, the disclosure of which is incorporated by reference herein. Referring to FIG. 1 which shows a portion of an imaging array 10, the Bayer pattern is a 2×2 pattern of red, green, green and blue filters 12A, 12B and 12C (generally 12), respectively, which is repeated across the array 10. To obtain true color images, an NIR blocking filter (not shown) covers the entire array 10 since the dye-based and pigment-based red, green and blue filters 12 typically used with image sensors are transparent in the NIR. When used for night vision sensors, the signal generated by each pixel 12 is small and the SNR is poor, therefore the ability to provide any useful information for true color interpretation is severely limited.

Figure 2:
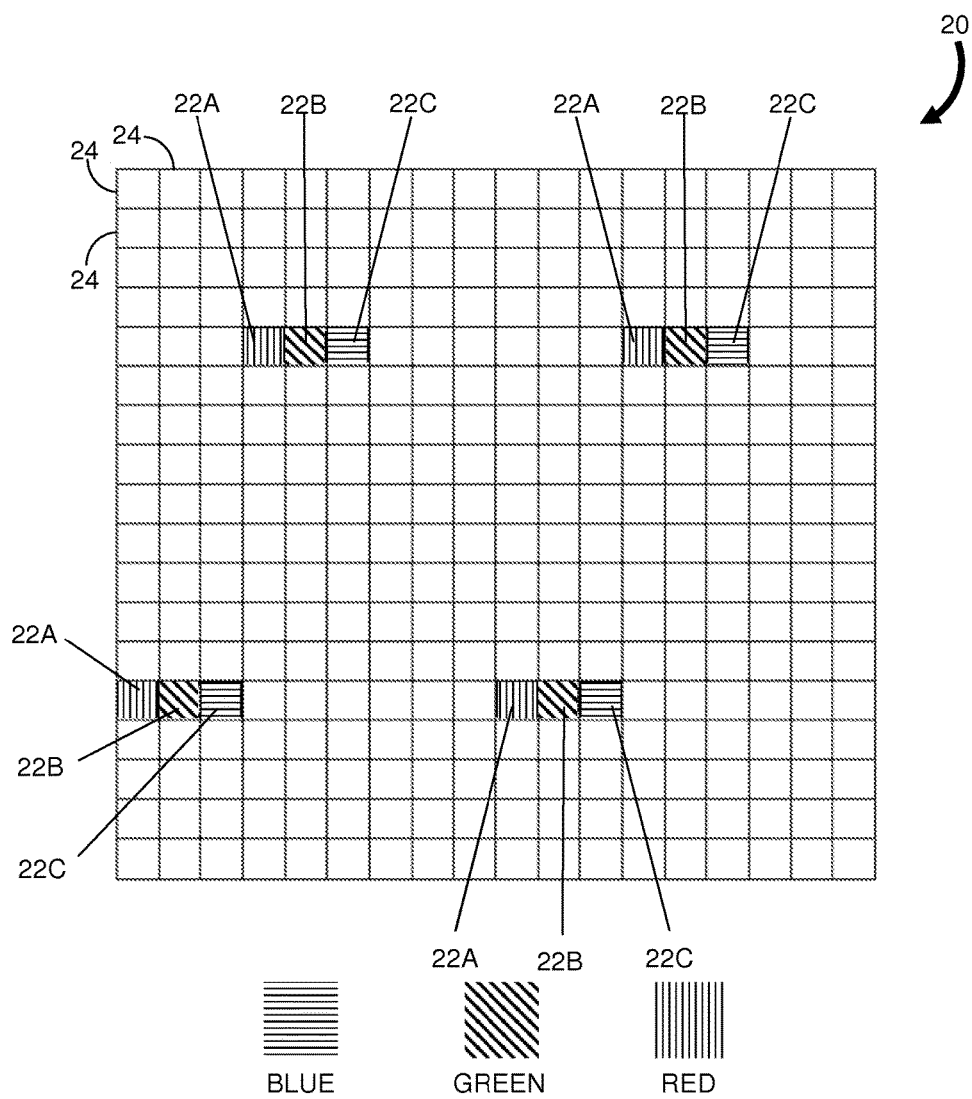
FIG. 2 is an illustration of a portion of a visible and NIR imaging array having a limited number of red pixels, green pixels and blue pixels widely distributed through the array.

Several approaches have been used to provide color information for night vision, but each of these has significant drawbacks. One such method is to use color filters over only a small fraction of the total number of pixels. This method is referred to as "sparse color" and is described for a low light level camera in U.S. Pat. No. 7,012,643. FIG. 2 shows a portion of a visible and NIR imaging array 20. A limited number of red pixels, green pixels and blue pixels 22A, 22B and 22C (generally 22), respectively, are widely distributed through the array 20. If commonly used dye and pigment-based color filters are used, a NIR blocking filter must be placed over only the pixels 24 that have color filters, or the colors will be distorted due to the NIR transmission of the red, green and blue filters. Fabrication of a pixel-level NIR blocking filter is difficult. This sparse color technique has the advantage that most pixels 24 capture all photons in the visible and NIR spectrum. The scattered pixels 22 having color filters and NIR blocking filters provide a limited amount of color information for large objects in the scene; however, the color information is at a low spatial resolution and requires interpolation over long distances. Consequently, there may be only "blobs" of color evident in the acquired images. Color noise also appears as blobs that appear unnatural and hinder interpretation by the viewer. Moreover, the color of any small objects in the scene is either lost or distorted. In a video sequence of a small moving object, the sparse color image of the object may change color during movement. Another disadvantage is that accurate placement and alignment of the NIR blocking filters is difficult to achieve.

Another method to obtain color information for night vision is based on acquiring images sequentially in different colors. This is achieved by placing, for example, a red filter in front of a camera for the first frame, green for the second frame, and blue for the third frame, then repeating the sequence of acquiring the first, second and third frames. Filter placement can be achieved using a mechanical filter wheel or an electronically switched filter such as a liquid crystal. Unfortunately, in addition to the reduction in signal caused by the spectral filter, the information captured by each color occurs at a different time. Consequently, if there is any movement from frame to frame, the colors can be distorted. In addition, the frame rate of the low light sensitive panchromatic channel is reduced to levels which may be unacceptable.

Another method is based on use of a conventional color imager with a Bayer pattern or similar pattern, and uses an NIR cut filter under high illumination conditions. The NIR filter is mechanically removed when the light dims below a certain level. While this method provides good color for daytime images and good panchromatic night images, it cannot provide good quality color images at low light levels. Other disadvantages include an increased camera size and reduced reliability due to the mechanism used to move the NIR filter.

In another method, a 2×2 pattern of blue+NIR, red+NIR, green+NIR and NIR only filters are used. A true color is created by subtracting the signals for the color+NIR pixel and the NIR only pixel where "color" is one of blue, red or green. This method is based on the assumption that the NIR signal in the color+NIR pixel is the same as the NIR signal in the NIR only pixel; however, the NIR intensity can vary with location within the scene. Another disadvantage is the requirement to subtract two signals to determine a color. When signals are subtracted, the level of the resulting signal decreases while the noise increases because the noise is uncorrelated between the pixels. This effect is especially detrimental in low light imaging where low SNR operation is common.

Some high performance daytime cameras, such as those used in broadcast television, use three separate sensors with each sensor dedicated to one color in order to obtain higher quality color images. Chromatic beam splitters, such as dichroic splitters, are used to separate the different colors in the image. Light for a particular color is directed to one of the three sensors thus the SNR for each color band is preserved. This method does not capture light in the NIR spectrum and therefore limits sensitivity for night vision. In addition, the use of three separate sensors results in increased size, cost and power.

In brief overview, embodiments of imaging sensors and methods according to the invention allow true color information to be acquired while maintaining a high SNR in low light level applications such as night vision. Imagers constructed in accordance with the invention have a pixel structure that includes a portion which is color sensitive and a remainder that is sensitive to panchromatic light, that is, unfiltered light at wavelengths at which the pixel is responsive. For example, in embodiments directed to CMOS imaging sensors, the pixels may be sensitive to light in the visible and NIR spectral range. Such imaging sensors are beneficial for applications requiring wide dynamic range, low light sensitivity and color discrimination. For example, the imaging sensors may be used for security and surveillance applications, and in man-portable units, airborne vehicles and ground vehicles for color night vision systems. Other example applications include underwater imaging and biofluorescence imaging. Such systems are capable of improved object discrimination and scene interpretation. Automotive applications include back-up cameras and cameras for side-view minor replacement where the ability to operate in bright sunlight to low light nighttime conditions are desirable.

Figure 3:
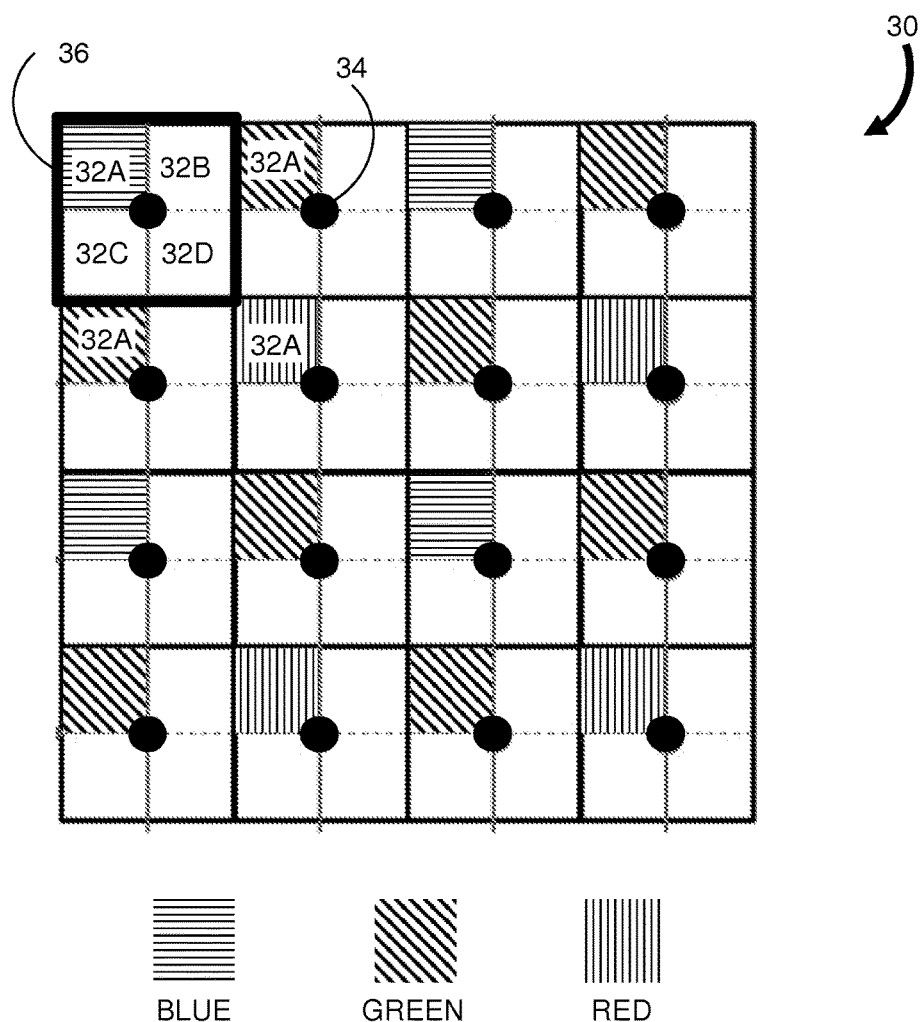
FIG. 3 is an illustration of a portion of an imaging sensor according to one embodiment of the invention in which each pixel includes four sub-pixels a color filter disposed over the photosensitive area of one of the sub-pixels.
Figure 4:
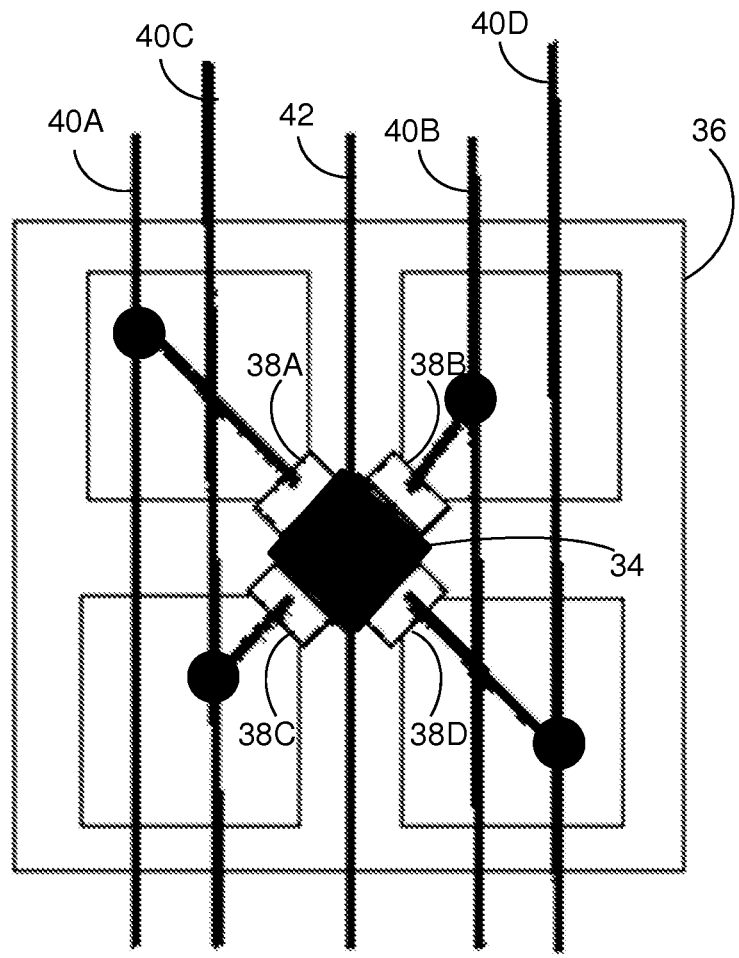
FIG. 4 depicts a pixel structure for the pixels of the imaging sensor of FIG. 3.

FIG. 3 is a diagram showing a portion of an imaging sensor 30. Each pixel includes four sub-pixels 32A, 32B, 32C and 32D (generally 32). A color filter is disposed over the photosensitive area of the single sub-pixel 32A used for color detection. The color filter allows only light of a particular color (blue, green or red) to be sensed and prevents NIR light and light of other colors from reaching the sub-pixel 32A. The color filters may be oversized with respect to the photosensitive areas of the color sub-pixels 32A to ensure that light rays at shallow angles of incidence on the photosensitive areas first pass through the corresponding color filter. Sub-pixels 32B, 32C and 32D have no filters and therefore are sensitive to light across the full panchromatic spectral range which includes both the visible and NIR spectral ranges. Referring also to FIG. 4, each pixel 36 is structured such that the photo-generated charge collected and stored in each sub-pixel 32 can be transferred to a readout node 34. The charge can be transferred from the photosensitive area to the common readout node from each sub-pixel in sequence or from multiple sub-pixels simultaneously. The process of transferring charge from any combination of the sub-pixels 32 to the readout node 34 at one time is referred to as "charge binning." If charge from more than one sub-pixel 32 is transferred, the charges are added (or binned) in the readout node 34. Each of the four sub-pixels 32 has a transfer transistor 38A to 38D which is controlled by a respective transfer line 40A to 40D and acts as a switch for transferring the associated charge to the readout node 34. The binned charge is accumulated at the readout node 34, buffered by pixel circuits (not shown) and read via readout line 42.

In order to minimize the reduction in sensitivity of a true color imager compared to a panchromatic imager, only a portion of the photosensitive area of each pixel 36 is used to determine color. Thus, for the four sub-pixel configuration for the imaging sensor of FIG. 3, the sensitivity is only slightly reduced, that is, reduced by 25% or less. In the Row 1, Column 1 pixel, the color sub-pixel 32A is used to detect blue light and in the Row 1, Column 2 pixel, the color sub-pixel 32A is used to detect green light. In the Row 2, Column 1 pixel, the color sub-pixel 32A is used to detect green light and in the Row 2, Column 2 pixel, the color sub-pixel 32A is used to detect red light. Thus this grouping of 2×2 pixels has a color filter configuration that is the same as a conventional Bayer color filter. In other embodiments, the sub-pixels 32A used to detect light of a specific color within a grouping of pixels can be configured according to a different color pattern.

To read image data, a single row is selected and three sub-pixel transfer transistors 38B, 38C and 38D are enabled to transfer charge from the corresponding three panchromatic sub-pixels 32B, 32C and 32D to the readout node 34. The binned charge is read out along the column. Subsequently, the three transfer transistors are disabled and the transfer transistor 38A coupled to the color sub-pixel 32A is enabled so that the color data can be read out on each column. All columns in a row are read out in parallel. The row can then be reset and cleared of charge, and the next row selected and read out. Other operations, such as correlated double sampling (CDS), electronic shuttering and windowing, are performed similarly to that of a panchromatic imager. For greatest sensitivity at low light levels and a fast frame rate, the ability to acquire color information can be disabled and all four sub-pixels 32 in each pixel 36 can be transferred simultaneously to the readout node 34.

As described above, each color sub-pixel 32A has a photosensitive area that is approximately equal to 25% of the photosensitive area of the entire pixel 36. The resulting light loss for color image data can be compensated by enabling the color sub-pixels 32A to integrate charge for four times the integration time used for the panchromatic sub-pixels 32B, 32C and 32D. For example, panchromatic image data can be read at a frame rate of 60 Hz while the color image data obtained with the longer integration time can be read at a rate of 15 Hz. An independent reset line can be included as part of the structure of each pixel so that the color image data are read only once for every four frames of panchromatic image data. In other embodiments the integration times can be independently varied and the read rates for the color image data and the panchromatic image data can be independently varied.

Figure 5A:
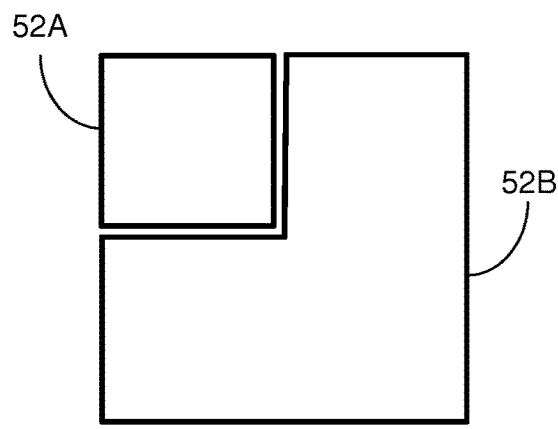
FIG. 5A through FIG. 5C show pixel structures having two sub-pixels with different photosensitive areas according to other embodiments of the invention.
Figure 5B:
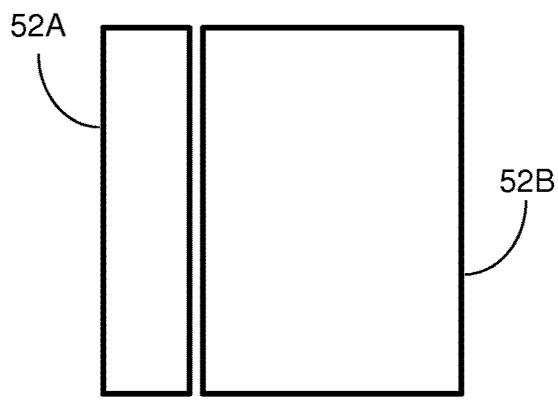
Figure 5C:
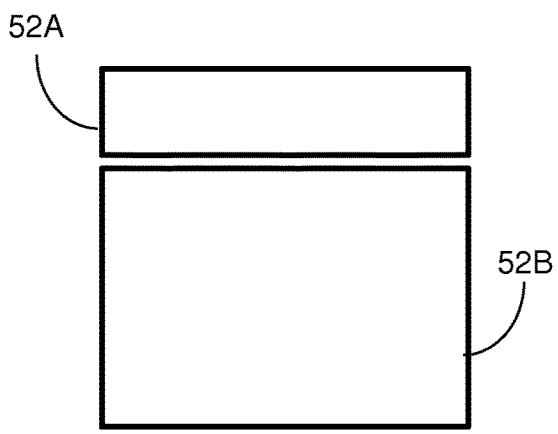

In an alternative embodiment of an imaging sensor in accordance with the principles of the invention, each of the pixels 60 can be structured to have only two sub-pixels as shown in FIG. 5A. For example, the sub-pixel 52B for detecting light in the panchromatic spectral range can have a photosensitive area that is approximately three times the photosensitive area of the color sub-pixel 52A. In this embodiment, no binning of charges from multiple sub-pixels is required. Although shown as square-shaped and L-shaped, the photosensitive areas may have rectangular shapes as shown in FIG. 5B and FIG. 5C. In other embodiments the sub-pixels can have other shapes and two or more sub-pixels may be combined for charge binning regardless of the particular shape of the sub-pixels. Moreover, it will be recognized that the number of sub-pixels in each pixel for any of the embodiments can be two or more.

Various modifications to the embodiments described above may achieve benefits suited for particular applications. For example, in some embodiments the total photosensitive area of the one or more sub-pixels in each pixel that detect light in the panchromatic spectral range can be equal to or less than the total photosensitive area of the one or more sub-pixels used to detect color or a sub-band of the panchromatic spectral range.

Figure 6:
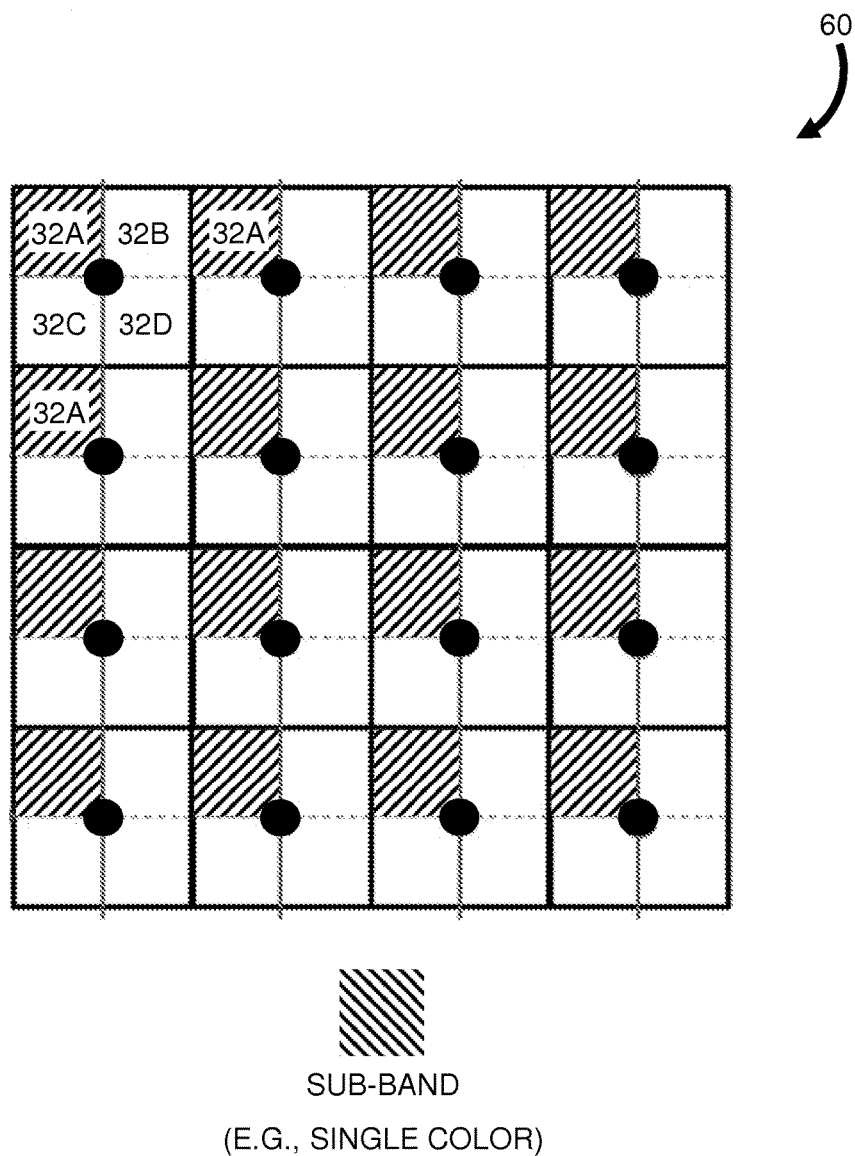
FIG. 6 is an illustration of a portion of an embodiment of an imaging array in which all the sub-band pixels are filtered to detect the same color.

In the various embodiments described above, multiple colors of light are detected by the color, or sub-band, sub-pixels 32A or 52A according to the use of different color filters. In other embodiments only a single color or sub-band of the panchromatic spectrum is detected for one or more sub-pixels while the other sub-pixels detect light in the full panchromatic spectral range. For example, the sub-band can be one of a red, green or blue color. FIG. 6 shows a portion of an imaging array 60A in which all the sub-band pixels 32A are filtered to detect the same color. Alternatively, the sub-band pixels 32A may be filtered to detect a subset of the NIR wavelengths in the panchromatic spectral range. In other embodiments, the panchromatic spectral range and the one or more sub-bands may include different wavelength ranges of radiation which may be sensed by the photosensitive areas of sub-pixels for different type of imaging sensors such as UV imaging sensor and other infrared spectral range sensors. In other embodiments, the multiple panchromatic sub-pixel regions can be read out sequentially rather than simultaneously (binned), providing additional spatial resolution in the panchromatic band.

In various embodiments described herein, each pixel includes one or more panchromatic sub-pixels and at least one color sensing sub-pixel. This pixel structure can be difficult to achieve because conventional dye-based or pigment-based color filters are transparent to NIR light. If used without an additional NIR block filter, the color purity for the color sub-pixels is distorted and the color quality is poor. Conventional imaging sensors often use a separate (external) NIR block filter disposed in front of the sensor to prevent NIR light from reaching any of the pixels; however, to achieve sufficient sensitivity for night vision or other low light applications, detection of light in the NIR spectrum is required. Conventional imaging sensors that can block NIR light from distributed individual pixels or sub-pixels within the imaging sensor are not available due in part to the difficulty to provide a pixelated NIR block filter that can be precisely aligned to the pixels in a night vision camera.

Plasmonic filters have been developed for optical spectrum filtering of light. U.S. Pat. No. 8,848,140, the disclosure of which is incorporated by reference herein, describes plasmonic devices for optical spectrum filtering and methods of fabrication of such devices. Typically, a plasmonic filter includes one or more layers of periodic metal patterns, such as a periodic line segment pattern, where the dimensions of the line segments and the separations between the line segments are on the order of the wavelength of the light to be filtered. These periodic metal patterns can be formed using conventional CMOS processing and can be configured in an imaging sensor to control the spectral transmission of the light incident on the photosensitive area of a sub-pixel. For example, a NIR block filter can be formed and aligned to the pixel structure with the proper sub-pixel registration. A plasmonic NIR block filter, or a stack of plasmonic NIR block filters, can be used with conventional dye-based red, green or blue filters in an imaging sensor to achieve the pixel structure shown in FIG. 3 with proper NIR light rejection.

Figure 7:
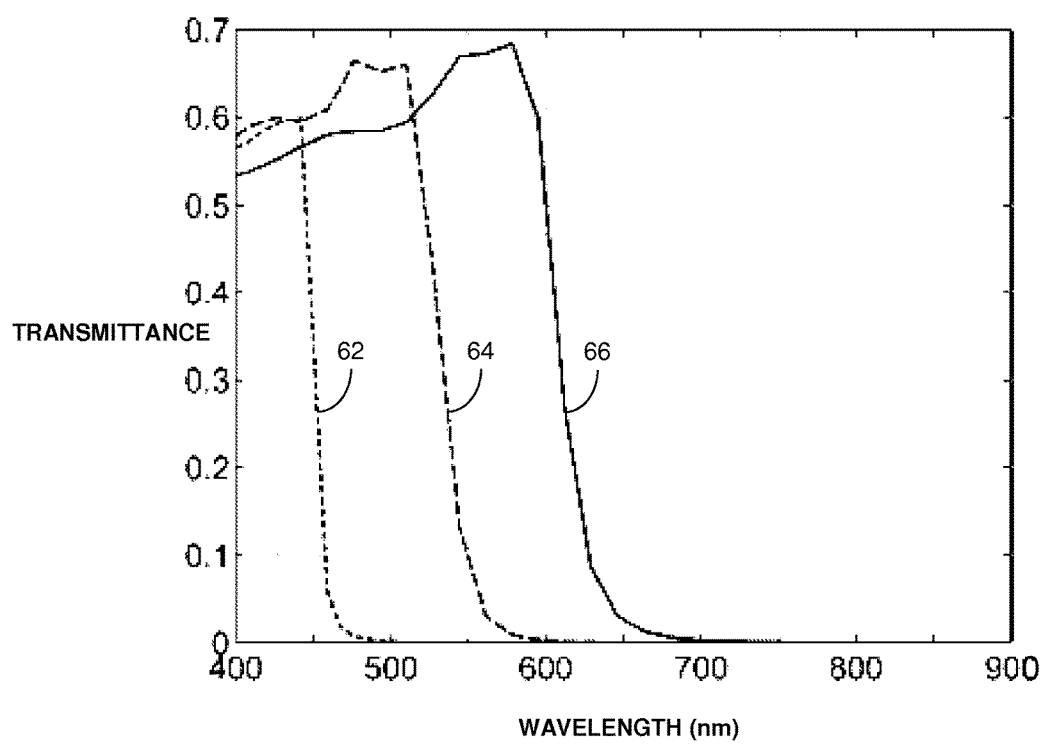
FIG. 7 is a graphical depiction of an example of transmittance as a function of wavelength for plasmonic filters having different line and spacing dimensions.

FIG. 7 shows an example of the transmittance as a function of wavelength for three different plasmonic filters each having different line and spacing dimensions. Plots 62, 64 and 66 correspond to periodic metal patterns having feature sizes of 0.13 µm, 0.15 µm and 0.18 µm, respectively. A plasmonic filter formed with a CMOS 0.18 µm process can be used to form a metal pattern having a feature size corresponding to a longer cut-off wavelength (e.g., greater than 700 nm) to permit visible light to pass while blocking NIR light. Plasmonic filters can be formed with multiple layers of patterns and can be used to define a passband transmittance. These types of plasmonic filters allow for direct replacement of the dye-based red, green and blue color filters for sub-pixels as an alternative means to achieve the pixel structure shown in FIG. 3. As described above for conventional color filters, the plasmonic filters can be formed to have greater areas than the photosensitive areas of the corresponding sub-pixels to ensure that rays incident on the photosensitive areas at shallow angles pass through the plasmonic filter.

Figure 8:
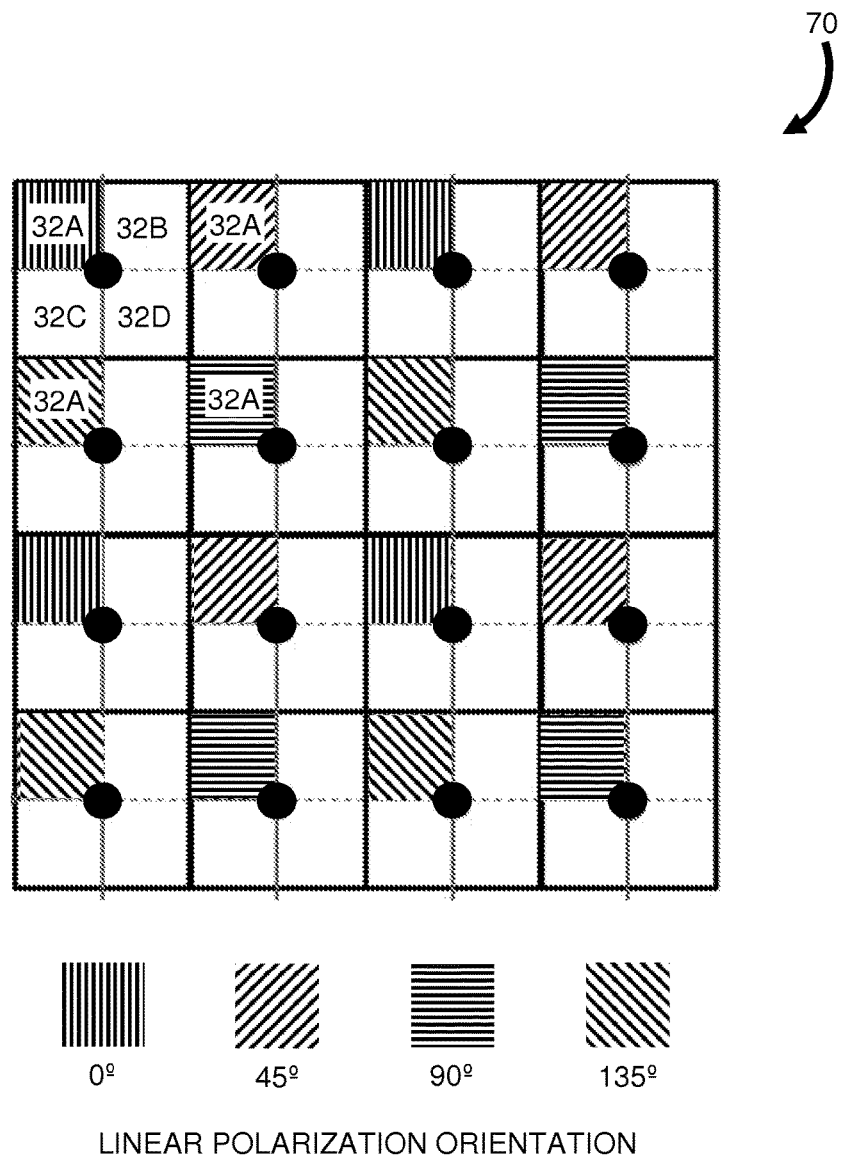
FIG. 8 is an illustration of a portion of an embodiment of an imaging array in which some of the sub-pixels are used to detect polarized light at different polarization orientations.

Plasmonic filters can also be used as polarization filters. Consequently, plasmonic filters can be used to provide polarization detection capability at the pixel and sub-pixel level. For example, each sub-band pixel 32A in the pixel structure shown in the imaging sensor 60 of FIG. 6 can be used to detect linearly polarized light in accordance with the orientation of the line segments of the plasmonic filter. A preferred embodiment is shown in FIG. 8 in which an imaging sensor 70 is capable of producing images with spatially-dependent polarization characterization. Each pixel includes four sub-pixels 32 with one of the sub-pixels 32A configured to receive linearly polarized light according to a particular polarization orientation. Each 2×2 grouping of pixels includes four polarization sub-pixels 32A each having a filter polarization orientation at one of 0°, 45°, 90° and 135°. The imaging sensor 70 can be operated to obtain low light level polarization images. It will be recognized that other embodiments of low light level imager sensors with polarization sensing capability can use other forms of polarizing elements or polarization filters aligned to the appropriate sub-pixels.

In alternative embodiments of the imaging sensor, the total photosensitive area of the one or more sub-pixels in each pixel that are dedicated to detection of linearly polarized light can be equal to or greater than the total photosensitive area of the one or more sub-pixels that are unfiltered for polarization.

Although specific embodiments described above relate to conventional dye-based color filters and plasmonic filters, it will be recognized by those of skill in the art that other types of filters, such as multi-layer interference filters, may be used. The filters can be formed on imaging sensors configured for either front side illumination or back side illumination. A thinned backside illumination imaging sensor provides a smooth flat surface convenient for application of patterned color filters, patterned plasmonic filters, or a combination patterned color and plasmonic filters. The imaging sensor optionally includes microlenses. The improved quantum efficiency of the backside illuminated imaging sensor is beneficial to operation under low light conditions and especially for color imaging under low light conditions.

Although various embodiments described herein are described with respect to CMOS imaging sensors, other embodiments include charge coupled device (CCD) imaging sensors and electron multiplying charge coupled device (EMCCD) imaging sensors. Some embodiments of imaging sensors described above relate to a panchromatic spectral range that includes visible and NIR light, and colors that are defined by subsets of the visible spectrum. It will be appreciated that in other embodiments, the panchromatic spectral range and color spectral bands may be different. For example, pixel structures may be used which have sensitivity in one or more spectral ranges pertaining to ultraviolet, visible and infrared light. In addition, any number of two or more sub-pixels may be used, the size of sub-pixels within a pixel may differ, and the number of sub-pixels in a pixel that are combined through charge binning for panchromatic imaging or color imaging can vary.

While the invention has been shown and described with reference to specific preferred embodiments, it should be understood by those skilled in the art that various changes in form and detail may be made therein without departing from the spirit and scope of the invention as defined by the following claims.

What is claimed is:

1. An imaging sensor for low light level color imaging, comprising:
    an array of pixels, each of the pixels comprising:
        a first pixel portion that has a first photosensitive area and is responsive to light in a panchromatic spectral range, wherein the panchromatic spectral range includes visible light and near infrared light;
        a second pixel portion that has a second photosensitive area and is responsive to light in a sub-band spectral range, the first photosensitive area being greater than the second photosensitive area and the sub-band spectral range being narrower than and contained within the panchromatic spectral range a readout node;

at least one first transfer transistor in communication with the first pixel portion and the readout node; and at least one second transfer transistor in communication with the second pixel portion and the readout node, wherein the at least one first transfer transistor is configured to transfer charge from the first pixel portion to the readout node for a panchromatic image and wherein the at least one second transfer transistor is configured to transfer charge from the second pixel portion to the readout node for a sub-band image.

2. The imaging sensor of claim 1 wherein the first pixel portion in each of the pixels comprises a plurality of sub-pixels, and wherein the at least one first transfer transistor comprises a plurality of first transfer transistors.

3. The imaging sensor of claim 2 wherein each sub-pixel of the plurality of sub-pixels is in communication with a respective one of the plurality of first transfer transistors.

4. The imaging sensor of claim 1 wherein the second pixel portion is responsive to light in one of a plurality of sub-band spectral ranges, each of the sub-band spectral ranges being narrower than and contained within the panchromatic spectral range.

5. The imaging sensor of claim 4 wherein the plurality of sub-band spectral ranges includes a blue spectral range, a green spectral range and a red spectral range.

6. The imaging sensor of claim 5 wherein, for a plurality of 2×2 groupings of adjacent pixels in the array, the second pixel portions in each of the 2×2 groupings are arranged according to a Bayer filter configuration.

7. The imaging sensor of claim 1 wherein each of the second pixel portions includes at least one sub-pixel having a sub-band filter.

8. The imaging sensor of claim 7 wherein the sub-band filter comprises one or more of the filters in a group of filters comprising a dye-based color filter, a pigment-based color filter, a dye-based near infrared blocking filter, a pigment-based near infrared blocking filter, a multi-layer interference filter and a plasmonic filter.

9. The imaging sensor of claim 7 wherein the sub-band filter comprises a color filter and a near infrared blocking filter.

10. The imaging sensor of claim 9 wherein the color filter is one of a dye-based color filter and a pigment-based color filter.

11. The imaging sensor of claim 9 wherein the near infrared blocking filter is one of a plasmonic filter and a multi-layer interference blocking filter.

12. The imaging sensor of claim 7 wherein an area of the sub-band filter is greater than the second photosensitive area.

13. The imaging sensor of claim 1 wherein the panchromatic spectral range includes wavelengths between 400 nanometers and 1100 nanometers.

14. The imaging sensor of claim 2, wherein the first pixel portion in each of the pixels comprises at least three sub-pixels.

15. A method for low light level color imaging, the method comprising:

for each pixel in an array of pixels in an imaging sensor, wherein each pixel comprises a first pixel portion responsive to light in a panchromatic spectral range, wherein the panchromatic spectral range includes visible light and near infrared light, a second pixel portion and a readout node connected to the first pixel portion via at least one first transfer transistor and connected to the second pixel portion via at least one second transfer transistor, wherein the first pixel portion has a photosensitive area that is greater than a photosensitive area of the second pixel portion, filtering light incident on the second pixel portion so that only light in a sub-band spectral range that is narrower than and contained within the panchromatic spectral range is incident on the photosensitive area of the second pixel portion;

reading panchromatic image data for an image formed on the array of pixels, wherein reading the panchromatic image data comprises disabling the second transfer transistors and enabling the first transfer transistors to transfer charge to the readout nodes; and reading sub-band image data for the image formed on the array of pixels, wherein reading the sub-band image data comprises disabling the first transfer transistors and enabling the second transfer transistors to transfer charge to the readout nodes.

16. The method of claim 15 wherein the reading of the panchromatic image data is at a first frame rate and the reading of the sub-band image data is at a second frame rate, and wherein the first frame rate is higher than the second frame rate.

17. The method of claim 15 wherein the first pixel portion in each pixel comprises a plurality of sub-pixels, the method further comprising binning charges of the plurality of sub-pixels in each pixel.

18. The method of claim 15 wherein the filtering of the light incident on the second pixel portion comprises filtering so that only light in one of a plurality of sub-band spectral ranges is incident on the photosensitive area of the second pixel portion, each of the sub-bands being narrower than and contained within the panchromatic spectral range.

19. The method of claim 18 wherein reading the sub-band image data comprises reading color image data for a blue spectral range, a green spectral range and a red spectral range.

20. The method of claim 15, wherein the panchromatic spectral range includes wavelengths between 400 nanometers and 1100 nanometers.

* * * * *